United States Patent [19]
Johansson

[11] 3,921,489
[45] Nov. 25, 1975

[54] GANG SAW WITH IMPROVED CUTTING ACTION
[75] Inventor: Tage Hjalmar Johansson, Sollentuna, Sweden
[73] Assignee: Kockum Industri Aktiebolag, Soderhamn, Sweden
[22] Filed: Apr. 5, 1974
[21] Appl. No.: 458,443

[30] Foreign Application Priority Data
Apr. 13, 1973 Germany............................ 2318819

[52] U.S. Cl..................................... 83/779; 83/751
[51] Int. Cl.² .......................................... B27B 3/10
[58] Field of Search...................... 83/751, 779, 748

[56] References Cited
UNITED STATES PATENTS
264,473  9/1882  Nixon ................................. 83/751
375,285  12/1887  Haake ................................. 83/751
377,630  2/1888  McEvilla ............................. 83/779

FOREIGN PATENTS OR APPLICATIONS
75,105  8/1932  Sweden .............................. 83/751

Primary Examiner—Donald R. Schran
Attorney, Agent, or Firm—Cushman, Darby & Cushman

[57] ABSTRACT

A gang saw operating system is provided for ensuring that favorable cutting conditions exist for the teeth of the gang saw blades. Each tooth on each blade moves along an 8-shaped path in a plane parallel to the planes of the saw blades. The sash mounting the blades is guided by spaced independently mounted but operatively connected guide rails. A motor operated crankshaft drives the sash to effect log cutting.

8 Claims, 3 Drawing Figures

GANG SAW WITH IMPROVED CUTTING ACTION

BACKGROUND OF THE INVENTION

This invention relates to a gang saw.

Gang saws are often used for the conversion of saw logs into boards and planks. The gang saws commonly used today have a main frame resting on a foundation and having vertical guides for a sash which is provided with parallel vertical saw blades and vertically reciprocable in the main frame, and a crankshaft coupled with the sash through a connecting rod. The log to be sawed is moved continuously and at a constant speed along a horizontal path through the main frame and the sash.

During each sawing cycle (one upward and one downward stroke of the sash) the sash moves vertically relative to the log at a speed that fluctuates between zero and a maximum value and the teeth of the saw blade consequently operate under very unfavorable conditions during a substantial portion of the sawing cycle. The operating conditions are particularly unfavorable when the sash is at or near the ends of its strokes, because then the speed is zero or very small.

The actual cutting of the log normally takes place only during the downward strokes of the sash, and in order that the backs of the cut during the upward strokes, the saw blades are adjusted to have an overhang, so that the line joining the tips of the teeth is inclined towards the incoming log. However, even if the saw blades have an overhang, the log will be pressed against the teeth at the beginning of the upward strokes.

It has been proposed in Swedish Pat. No. 121,556 to avoid this problem by moving the sash horizontally during its vertical reciprocation in such a manner that it is displaced in the log feed direction when at or near the lower end of the strokes, and possibly also when at or near the upper end of the strokes. To this end, in accordance with Swedish Pat. No. 121,556, the sliding bearing guides for the sash are mounted on a subframe and an eccentric drive imparts to the subframe a circular motion of a frequency twice that of the sash reciprocation. Thus, each tooth of the saw blades will be moved along a 8-shaped path in a plane parallel to the planes of the saw blades and, accordingly, parallel to the log feed direction and to the vertical longitudinal center plane of the main frame, the horizontal component of the motion of the sash having the same direction as the log feed at both ends of the vertical strokes. This proposal has not, however, found any significant practical application.

Another Swedish Pat. No. 75105, also attempts to avoid this problem by moving the sash horizontally in the log feed direction during some point in the vertical stroke of the saw. However, the gang saw of Swedish Pat. No. 75105 operates at a speed below the natural frequency or critical speed of the system of movable interconnected elements, while the gang saw of the instant invention operates at a speed above the natural frequency of the moving system. This is because in the Swedish Pat. No. 75105 device the crankshaft rotates clockwise and relatively strong springs act on the sash guides, while in the instant invention the crankshaft rotates counterclockwise and relatively weak springs act on the guide supports. While operation below the critical speed is possible in the instant invention, such operation results in a more pointed and thus unfavorable shape of the 8-shaped or lemniscate path, and in increased forces acting between the slide blocks of the sash and the guide (and hence increased stresses and vibration). On the other hand, it is hardly possible to operate the saw of Swedish Pat. No. 75105 at supercritical speeds, due to the common suspension of the sash guides in pendulum fashion.

The object of the invention is to ensure favorable cutting conditions of the teeth of the saw blades in gang saws of the type mentioned in the introduction. The invention is based on the understanding that favorable cutting conditions can be attained if the sash moves along an 8-shaped path as explained above, and therefore, in the gang saw according to the instant invention, provisions are made to permit such a movement of the sash.

In contrast to the gang saw of Swedish Pat. No. 121,556 in which the movement of the sash along an 8-shaped path is positively guided, the gang saw according to the instant invention is characterized in that at least one of the upper and lower guides for the sash is freely oscillatable in a plane parallel to the longitudinal center plane of the gang saw under the influence of the forces which the connecting rod imposes on this guide through the sash while it reciprocates the sash vertically relative to the guides.

Since the guide is movable freely, that is, without positive guidance, parallel to the log feed direction, the horizontal component of the force that the connecting rod imposes on the sash, and that the sash in turn imposes on the guide, may be utilized to move the guide back and forth parallel to the log feed direction at a frequency equal to that of the vertical reciprocation of the sash such that the desired movement of the tips of the teeth along an 8-shaped path is obtained. This is because this force component varies periodically and changes its direction both when the sash is at the ends of its strokes and when it is at a point between the ends of its stroke.

Preferably, the guides are mounted on two supports which are disposed one above the other and oscillatable about separate axes of oscillation perpendicular to the vertical longitudinal center plane of the gang saw, that is, parallel to the axis of rotation of the crankshaft, and which are coupled together to oscillate simultaneously and in the same direction about their respective axes of oscillation.

One advantage of this arrangement over that of Swedish Pat. No. 75105 is that the location of the point of zero horizontal deflection of the sash (the point where the 8-shaped locus of the tip of each saw tooth intersects itself) is determined only by the geometry of the moving system, and doesn't vary with the forces and speed of operation. Thus, with a suitable choice of the geometry, particularly a suitable choice of the positions of the axes of oscillation relative to the path traversed by the point of action of the aforesaid horizontal component during the reciprocation of the sash, the horizontal component of the sash movement may correspond to optimum, or at least very favorable, cutting conditions of the saw blades throughout the sawing cycle. Another advantage is that the guide supports oscillate at a frequency equal to the crankshaft speed, not at twice the crankshaft speed as in Swedish Pat. No. 75105. Still another advantage is the possibility in the instant invention of adjusting the amplitudes of the horizontal oscillation of the upper and lower sash portions relative to each other.

BRIEF DESCRIPTION OF THE DRAWINGS

A gang saw constructed in accordance with the invention is shown by way of example in the drawing and will be described hereinafter. In the interest of clarity, only such parts are shown which are essential to the understanding of the invention.

DETAILED DESCRIPTION OF THE INVENTION

Figure 1:
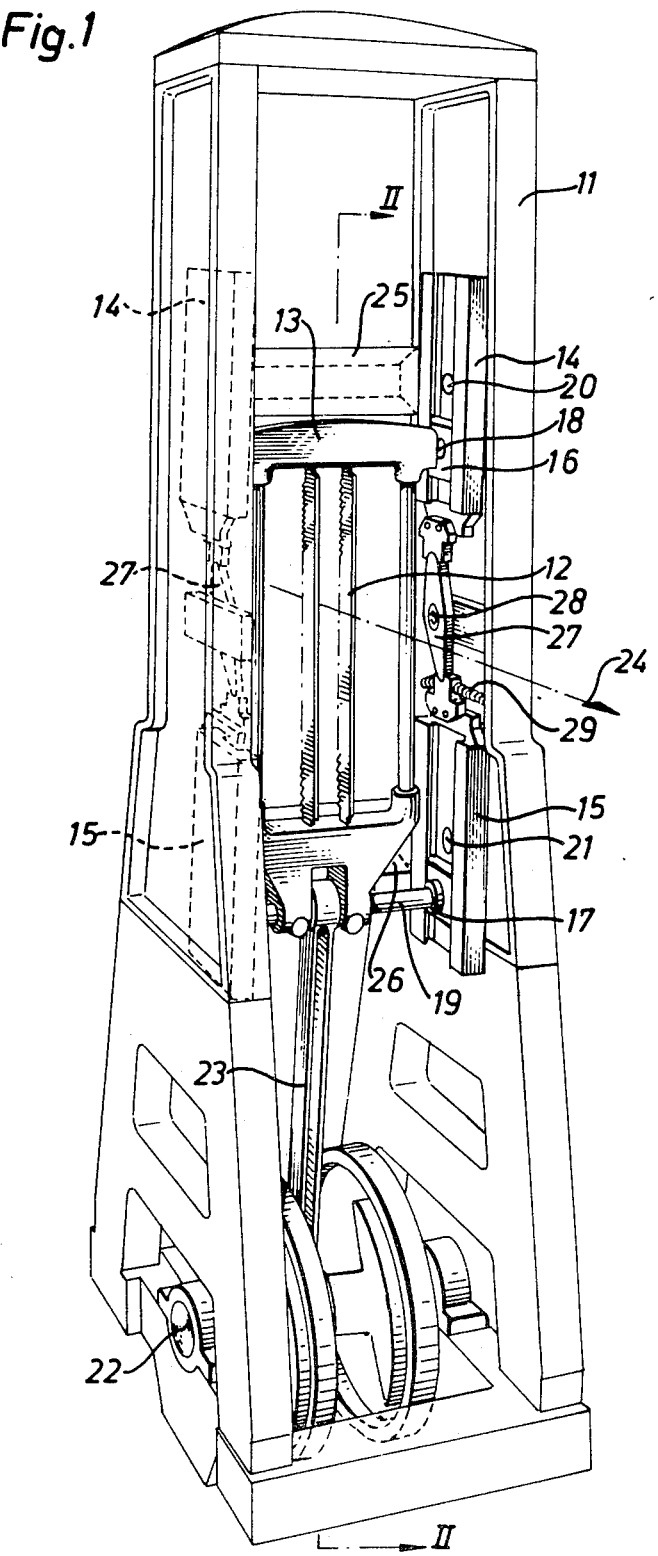
FIG. 1 is a perspective view of the gang saw as seen from the exit side of the sawed timber.

The illustrated gang saw has a main frame 11 which rests on a foundation (not shown) and supports the other main parts. These main parts include a sash 13 with parallel vertical saw blades 12, and upper and lower guide rails 14 and 15, respectively, which define straight guide tracks for upper and lower slide blocks 16 and 17 on the sash. Thus, the sash can be reciprocated vertically relative to the guide rails. The slide blocks 16 and 17 on the sash are rotatable on horizontal, parallel shafts 18 and 19, and the guide rails 14 and 15 are oscillatable about a vertical mean position on horizontal and parallel shafts 20 and 21, respectively, which are supported in the main frame and secured to the guide rails approximately halfway between the ends of the guide tracks.

Adjacent its lower end the main frame 11 supports a crankshaft 22 which is rotatable about an axis parallel to the shafts 18, 19, 20 and 21. The crank of the crankshaft is connected to the sash 13 through a connecting rod 23 and the shaft 19. A motor (not shown) rotates the crankshaft at a constant speed of 300 to 400 rpm (counterclockwise as seen in FIG. 2).

The gang saw also includes a feed device having feed rolls 31 (see FIG. 2) which feed the log to be sawed through the main frame 11 and the sash 13 along a substantially horizontal line 24 extending in a vertical plane parallel to the planes of the saw blades and perpendicular to the axis of rotation of the crankshaft, namely, the longitudinal vertical center plane of the gang saw. The rate of feed may be adjustable but is not varied during a sawing cycle.

As seen from FIG. 1, the two upper guide rails 14 are rigidly connected with each other through a horizontal crossbar 25 so as to form together with this crossbar an upper guide support which is oscillatable about the shafts 20. Similarly, the two lower guide rails 15 are rigidly connected with each other through a horizontal crossbar 26 so as to form with the latter a lower guide support which is oscillatable about the shafts 21. The two guide supports are coupled with each other by means of two similar coupling links 27. Each coupling link 27 is formed by a two-armed lever which is oscillatable on a center shaft 28 parallel to the shafts 20 and 21. Teeth at the opposite free ends of the lever engage in recesses at the lower end of one of the upper guide rails 14 and at the upper end of the corresponding lower guide rail 15, respectively. The coupling links 27 ensure that the guide supports are always turned simultaneously and in the same direction about the shafts 20 and 21 so that the guide rails 14 and 15 are always parallel.

Figure 2:
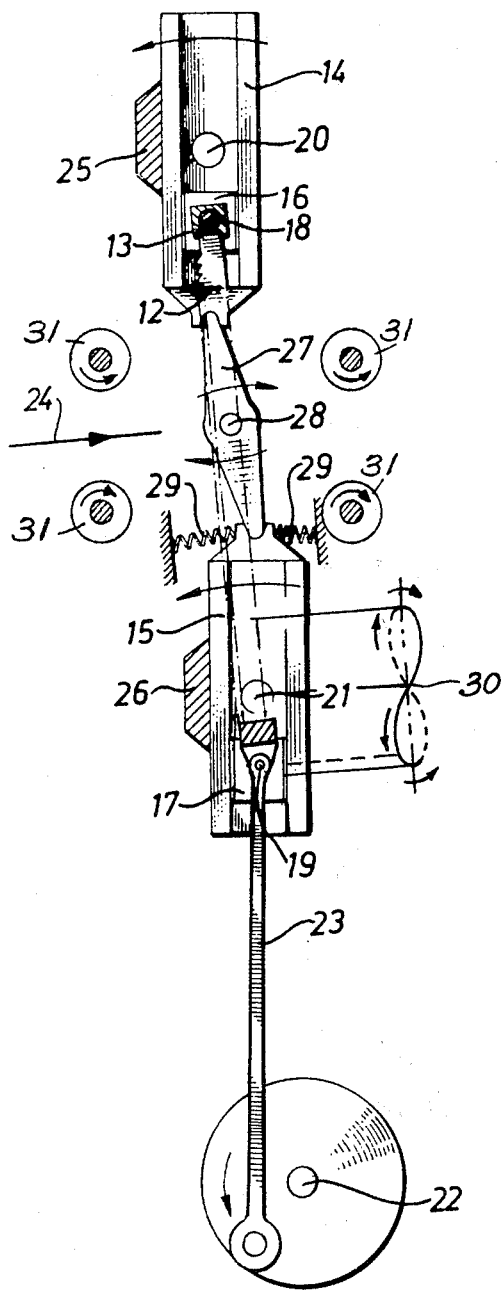
FIG. 2 is a side elevational view of the movable main parts as seen in the direction of the arrows II in FIG. 1.

As can best be seen from FIG. 2, the upper end of the lower guide support 15, 26 is acted on in opposite directions by compression springs 29. These springs always tend to move the lower and, accordingly, the upper guide support to a mean position in which the guide rails 14 and 15 are vertical. Disregarding the springs, the guide supports are freely oscillatable within limits defined by abutments (not shown). That is, the oscillation of the supports is not constrained within these limits by mechanical or physical means, and the momentary angular position of the supports thus is not dependent on the position of other parts of the gang saw. In the exemplary embodiment shown, the guide support shafts 20 and 21 are horizontally adjustable in the main frame 11, although in the interest of clarity the adjustment means are not shown.

As the illustrated gang saw is started up with the guide rails 14 and 15 initially in the vertical mean position, the horizontal component of the force that the upper end of the connecting rod 23 imposes on the lower guide rails through the shaft 19 and the slide blocks 17 mounted thereon, will cause the guide supports to oscillate about their vertical mean position at the frequency of the reciprocatory motion of the sash in the guide rails. The locus of the point where this horizontal component acts on the lower guide rails 15 is shown at 30 in FIG. 2; in the interest of clarity it is displaced from its actual location. The portion of the locus shown by a full line corresponds to the downward stroke of the sash and the portion shown by a dotted line corresponds to the upward stroke. It should be noted that when the guide rails are at their mean position, the shaft 19 is aligned with the shaft 21.

The oscillation of the guide supports is such that the upper end portions of the guide rails are moving clockwise away from the vertical mean position at maximum angular speed when the sash 13 and thus the guide blocks 16 and 17 are passing through the upper end of the upward stroke, and when these parts are passing through the lower end of the downward stroke, the guide supports are like-wise moving clockwise away from the vertical mean position at maximum angular speed. Thus, when the sash is passing through the ends of its vertical strokes and, accordingly, is not moving vertically, it moves horizontally at maximum speed, namely, in the direction of movement of the log.

The horizontal extension of the 8-shaped path depends on the geometry and of the masses of the moving elements but basically it is independent of the rotational speed of the crankshaft (assuming a crankshaft speed well above the natural frequency or critical speed of the system of relatively movable elements comprised of the sash and the parts connected therewith). In many cases the extension is not more than about 5 mm in either direction from the mean position and the angular deflection of the guide supports thus is relatively small.

In the illustrated exemplary embodiment the 8-shaped path is approximately symmetric with respect both to a vertical plane and to a horizontal plane. However, the shape and the orientation of the 8-shaped path may be changed as required by changing the geometry, e.g. by changing the length of the lever arms of the coupling links 27 or the positions of the shafts 20 and 21 relative to the main frame and the ends of the guide tracks traversed by the slide blocks 16 and 17.

For example, it is not necessary that the upper guide rails be parallel to the lower ones; instead they may include an angle with the lower guide rails. Moreover, without departing from the scope of the invention, the geometry may be chosen such that different teeth of one and the same saw blade traverse paths having different shapes and orientations.

Figure 3:
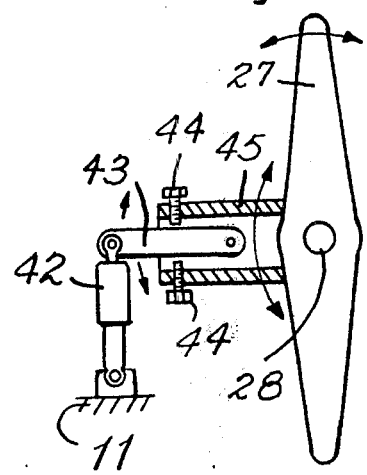
FIG. 3 is a side elevational view of a means that may be provided to damp the oscillations of the guide supports during the start up of the saw.

It is advantageous to provide some means for damping the oscillations of the guide supports during the starting up of the saw - that is while the crankshaft speed passes through a speed range extending on both sides of the critical speed of the system of relatively movable elements. To effect such damping a hydraulic dashpot 42 is connected between an arm 45 secured to the coupling link 27 and the main frame 11 through a lost motion connection (43, 44 - see FIG. 3) in such a manner that it is operative only during the starting up period (when the amplitude of the oscillations of the link 27 exceeds a predetermined value - that value being determined by adjusting the spacing between the stop screws 44 on arm 45 and the lever 43 pivotally connected between arm 45 and dashpot 42).

The foregoing specific embodiment has been described for the purpose of illustrating the principles of the present invention, and the same is subject to modification without departure therefrom. Therefore, the invention includes all modifications encompassed within the spirit and scope of the appended claims. Thus, it should be noted that although the illustrated embodiment having both the upper and lower guides oscillatable and coupled with each other is preferred in gang saws having a single connecting rod connected to the lower end of the sash as shown, it is within the scope of the invention to have the upper guides stationary with respect to the main frame so that only the lower guides oscillate. Moreover, in gang saws of the type having dual connecting rods connected to the upper portion of the sash on either side thereof, the lower guides may be stationary so that only the upper guides oscillate.

What I claim is:

1. A gang saw operating system comprising:
   a. a frame,
   b. feed means for feeding logs in a specific direction,
   c. a sash having saw blades mounted in vertical planes parallel to said log feed direction,
   d. drive means for reciprocating said sash up and down in said frame, said drive means including a crankshaft rotatable about an axis and a connecting rod interconnecting said crankshaft and said sash,
   e. guide means on said frame guiding said sash for up and down reciprocation in said frame, said guide means including
      i. relatively movable upper and lower guide devices guiding respectively upper and lower portions of said sash, and
      ii. means mounting at least one of said upper and lower guide devices for oscillation relative to said frame independently of said crankshaft in a plane parallel to the planes of said saw blades so that the horizontal oscillation of the sash is not positively guided and so that both guide devices are independent of said crankshaft, and
   f. means for moving each point of at least the sash portion guided by said one guide device along an 8-shaped path in a plane parallel to the planes of said saw blades, whereby favorable cutting conditions are ensured, said means including means pivotally connecting said connecting rod with said sash portion.

2. A gang saw operating system as recited in claim 1 further comprising spring means for biasing said one guide device into a center position.

3. A gang saw operating system as recited in claim 2 further comprising damping means for damping said one guide device during startup of the gang saw.

4. A gang saw operating system as recited in claim 3 wherein said mounting means include shaft means for pivotally mounting said one guide device.

5. A gang saw operating system as recited in claim 1 wherein said upper and lower guide devices include upper and lower guide rails defining straight guide tracks and wherein said mounting means include shaft means mounting said upper guide rails for oscillation relative to said frame about an axis parallel to the axis of said crankshaft and disposed adjacent a point approximately halfway between the ends of said upper guide tracks.

6. A gang saw operating system as recited in claim 5 further comprising means for biasing said one guide device into a center position.

7. A gang saw operating system as recited in claim 6 further comprising damping means for damping said one guide device during startup of the gang saw.

8. A gang saw operating system as recited in claim 1 wherein said drive means include means for rotating said crankshaft at a speed above the natural frequency of the system of relatively movable parts comprised of said sash, said connecting rod and said one guide device.

* * * * *